United States Patent
Ray (10) Patent No.: US 7,705,994 B2
(45) Date of Patent: Apr. 27, 2010

(54) MONOLITHIC DISPLACEMENT MEASURING INTERFEROMETER WITH SPATIALLY SEPARATED BUT SUBSTANTIALLY EQUIVALENT OPTICAL PATHWAYS AND OPTIONAL DUAL BEAM OUTPUTS

(75) Inventor: Alan B Ray, Palo Alto, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 153 days.

(21) Appl. No.: 11/286,817

(22) Filed: Nov. 23, 2005

(65) Prior Publication Data

US 2007/0115478 A1 May 24, 2007

(51) Int. Cl.
*G01B 9/02* (2006.01)
(52) U.S. Cl. .................................................. 356/487
(58) Field of Classification Search ................. 356/486, 356/487, 493, 498, 500
See application file for complete search history.

(56) References Cited

U.S. PATENT DOCUMENTS

| | | | | |
|---|---|---|---|---|
| 4,784,490 A | * | 11/1988 | Wayne | 356/487 |
| 4,802,764 A | * | 2/1989 | Young et al. | 356/487 |
| 5,191,391 A | | 3/1993 | Tsai | |
| 5,305,088 A | * | 4/1994 | Hosoe | 356/487 |
| 5,568,256 A | * | 10/1996 | Korner et al. | 356/512 |
| 6,181,420 B1 | * | 1/2001 | Badami et al. | 356/487 |
| 6,313,918 B1 | * | 11/2001 | Hill et al. | 356/498 |
| 2003/0211402 A1 | * | 11/2003 | Hill | 356/498 |

FOREIGN PATENT DOCUMENTS

| | | |
|---|---|---|
| EP | 0281385 | 9/1988 |
| EP | 0576885 | 1/1994 |
| EP | 0707191 | 4/1996 |
| JP | 09-178415 A * | 7/1997 |
| WO | 2006052816 | 5/2006 |

OTHER PUBLICATIONS

Malacara, Optical Shop Testing, 1992, pp. 101-102.*
Octrooicentrum Nederland, Search Report dated Feb. 10, 2009.

* cited by examiner

*Primary Examiner*—Michael A Lyons (57) ABSTRACT

An interferometer and corresponding system are provided having several aspects. In a first aspect, there is provided an interferometer adapted to receive separate first and second beams $f_1$ and $f_2$ therein, the interferometer comprising substantially equivalent and separate first and second optical pathways for the first and second beams $f_1$ and $f_2$. In a second aspect, there is provided an interferometer adapted to receive as separate inputs therein first and second beams $f_1$ and $f_2$, where such beams are not mixed or combined until just prior to being output by the interferometer. In a third aspect, an interferometer is provided having one or more beam blockers for intercepting extraneous or undesired light, and keeping such light from contaminating or interfering with separate beams $f_1$ and $f_2$.

20 Claims, 6 Drawing Sheets

MONOLITHIC DISPLACEMENT MEASURING INTERFEROMETER WITH SPATIALLY SEPARATED BUT SUBSTANTIALLY EQUIVALENT OPTICAL PATHWAYS AND OPTIONAL DUAL BEAM OUTPUTS

NOTICE OF POTENTIAL MILITARY APPLICATIONS

The inventors believe that the present invention described herein may be particularly well-suited to certain military applications.

BACKGROUND

Displacement measuring interferometers ("DMIs") are well known in the art, and have been used to measure small displacements and lengths to high levels of accuracy and resolution for several decades. Among such devices, helium-neon displacement measuring laser interferometers have enjoyed relatively widespread application owing to their high degree of stability and monochromaticity. Interferometers require careful alignment of mirrors that must be sustained over extended periods of time, however, which can present considerable practical difficulties.

A double-pass interferometer may be rendered partially insensitive to mirror misalignments by double-passing each arm of the interferometer and incorporating a means of inverting the wavefronts between passes. See, for example, "A Double-Passed Michelson Interferometer" by S. J. Bennett in Optics Communications, Volume 4, number 6, February/March, 1972, where double-passing is achieved using a polarized beam-splitter, two quarter-wave plates and a cube-corner reflector that serves as an inverting component. The entirety of the foregoing paper by Bennett is hereby incorporated by reference herein. In consequence of their commercial viability, robustness, stability and accuracy, double-pass displacement measuring interferometers find relatively common use in high accuracy displacement measurements.

Despite the many advances that have been made in the field of DMIs generally, however, measurement errors and inaccuracies persist. Among the factors contributing to such errors and inaccuracies are alignment errors and path length errors, optical mixing, thermal effects, polarization leakage (or the unintended mixing of measurement and reference beams), diffraction-induced fringing, non-linear relationships between phase and displacement, and other errors. See, for example, "Recent Advances in Displacement Measuring Interferometry" by Norman Brobroff in Meas. Sci. Technol. 4 (1993) 907-926, and "An Investigation of Two Unexplored Periodic Source Errors in Differential-Path Interferometry" by Schmitz and Beckwith in Precision Engineering 27 (2003) 311-322, where some of these factors are discussed in detail. The respective entireties of the foregoing papers by Broboff and Schmitz et al. are hereby incorporated by reference herein.

Most DMIs in the prior art combine reference and measurement beams before they are presented to the optical portion of an interferometer system. The non-ideal characteristics of the source and optics result in mixing of the reference and measurement beams before the desired displacement is measured. This is one of the principal means by which non-linear errors are introduced in DMIs. Another principal source of non-linear error in DMIs is diffraction-based interference. Some prior art DMIs employ a reflective aperture to separate a reference beam from a measurement beam, the two beams sharing a common annulus up to the reflective aperture. The result of such an architecture is that an interference beam is formed, which can degrade performance.

In a paper presented at the Annual Meeting of the ASPE in 2001 entitled "Demonstration of Sub-Angstrom Cyclic Non-Linearity Using Wavefront-Division Sampling with a Common-Path Laser heterodyne Interferometer," Feng Zhao of the Jet Propulsion Laboratory, California Institute of Technology, Pasadena, Calif. discloses a common-path heterodyne interferometer that attempts to minimize non-linear errors. Zhao isolates the reference and measurement beams over most of the optical path to the detector by using separate fiber optic channels for the reference and measurement beams. The reference beam has a first frequency and the measurement beam has a second frequency different from the first frequency. In rough terms, first and second beams corresponding to the first and second frequencies are generated and measured at separate first and second detectors. In some systems, however, things are more complicated than this. Instead, so-called "local oscillator" and "probe" beams are emitted by the source as two separate beams, the beams being mixed in the interferometer to produce measurement and reference beams at the output. This topic is discussed in further detail below.

For purposes of clarity and to avoid confusion, the terms "measurement beam" and "reference beam" are employed herein, but are to be understood as potentially being interchangeable with the terms "local oscillator beam" and "probe beam," respectively, depending upon the particular context in which either term may appear.

The first beam may be referred to as a reference beam produced by means of the first frequency beam impinging upon a stationary aperture. The second beam may be referred to as a measurement beam produced by the second frequency beam impinging upon a moving target. The phase difference between the first and second beams represents the position of the target. Zhao's interferometer architecture reduces non-linear errors in measured displacements. Zhao employs a wavefront division scheme, however, in which diffraction-based interference errors remain important because measurement and reference beams are annularly spaced apart from one another over essentially the same optical path. Moreover, it is not clear how Zhao's approach could be expanded to more than one optical axis.

What is needed is a DMI that further minimizes non-linear and diffraction-induced errors, and that may be scaled up or down over multiple optical axes in a straightforward and economic manner.

SUMMARY OF THE INVENTION

In accordance with one aspect of the present invention, there is provided a plane mirror interferometer adapted to receive two separate input light beams $f_1$ and $f_2$, respectively, wherein the interferometer keeps the two light beams $f_1$ and $f_2$ separate from one another until they are combined in a polarizing or non-polarizing rhomb sub-assembly just prior to being output by the interferometer, thereby reducing measurement errors introduced by polarization and other mixing.

In accordance with another aspect of the present invention, there is provided a plane mirror interferometer adapted to receive two separate input light beams $f_1$ and $f_2$, respectively, wherein the two path lengths traversed within the interferometer by the two light beams are substantially equivalent, thereby reducing thermally-induced measurement errors.

In accordance with yet another aspect of the present invention, there is provided a plane mirror interferometer system adapted to receive two separate input light beams $f_1$ and $f_2$, respectively, wherein the system comprises one or more beam blockers positioned between one or more quarter wave plates and one or more stationary or moving plane mirrors, the beam blockers being positioned and configured to intercept extraneous light, thereby reducing measurement errors.

In accordance with still another aspect of the present invention, an interferometer is provided comprising one or more of the foregoing aspects and further being scaleable an arbitrary number of optical axes.

Various embodiments of the present invention include within their scope components, devices and systems incorporating or employing the foregoing aspects, and methods of making and using components, devices and systems employing the foregoing aspects.

DETAILED DESCRIPTIONS OF THE PREFERRED EMBODIMENTS

Figure 1:
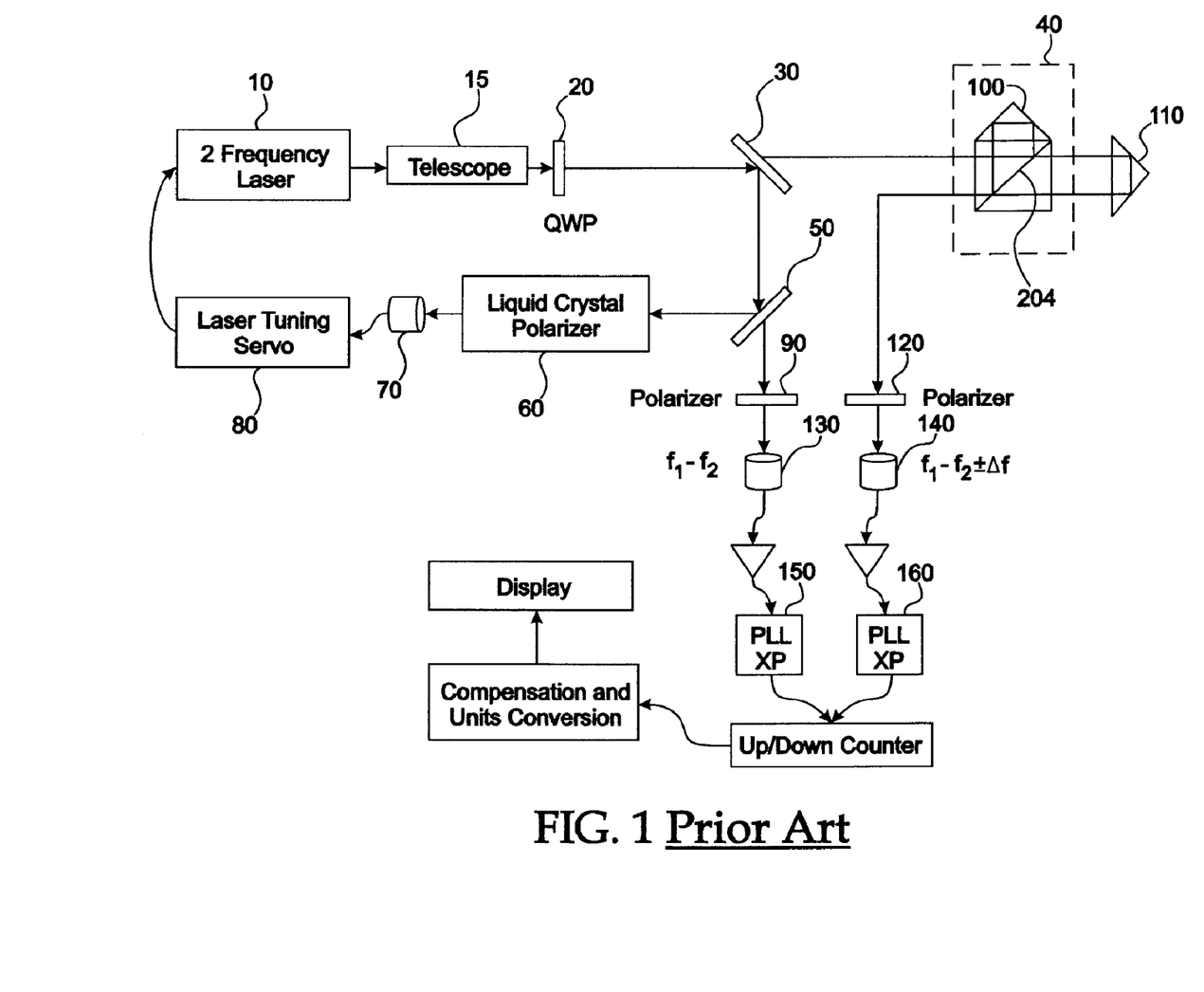
FIG. 1 shows a block diagram of a linear displacement measuring interferometry system of the prior art.

FIG. 1 shows a block diagram of a linear displacement measuring interferometry system of the prior art. A dual-frequency Zeeman split helium-neon laser source 10 generates and emits first and second beams having frequencies $f_1$ and $f_2$, where the first beam has a first circular polarization state and the second beam has a second circular polarization state different from the first polarization state (hereafter "beams $f_1$ and $f_2$"). Beams $f_1$ and $f_2$ emitted from source 10 are typically right- and left-rotationally polarized, respectively. Two laser modes are amplified in a cavity of source 10, the two modes corresponding to the two polarization states. In a Zeeman split laser, the two polarizations are circular and of opposite-handedness. Telescope 15 provides means for expanding and collimating beams $f_1$ and $f_2$ emitted by source 10 for delivery to the remainder of the interferometry system.

Beams $f_1$ and $f_2$ next pass through quarter wave plate 20, where they are transformed from circularly-polarized states to linearly-polarized states and then directed to non-polarizing beam splitter 30. (Note that means for appropriately aligning the linearly polarized beams with the plane of incidence of polarized beam splitter 204 or "PBS 204" are not shown in FIG. 1.)

Once the linearly polarized beams are appropriately aligned with the plane of incidence of polarized beam splitter 204 of interferometer 40, beam $f_1$ is transmitted to measurement cube corner 110, while beam $f_2$ is reflected to reference cube corner 100. After beams $f_1$ and $f_2$ are retro-reflected from their respective cube corners 100 and 110, beams $f_1$ and $f_2$ are recombined at polarized beam splitter 204 (or "PBS 204"). Interferometer 40 receives the transmitted portions of linearly polarized beams $f_1$ and $f_2$, and then directs respective portions of such beams to reference cube corner 100 and measurement cube corner 110.

Beams $f_1$ and $f_2$ reflected from reference cube corner 100 and measurement cube 110 are directed through second 45-degree polarizer 120. First and second 45-degree polarizers 90 and 120, respectively, recombine measurement and reference beams $f_1$ and $f_2$. Outputs from phase detectors 130 and 140 are input to phase lock loop detectors 150 and 160, which together yield a difference $\Delta f$, from which is determined the displacement measurement cube corner 110 has moved. Recombined beams $f_1$ and $f_2$ pass through polarizer 120, which leads to interference between the two orthogonally-polarized beams. The resulting interference beam is transmitted by polarizer 120 to photodiode 140 for detection. The frequency of the resulting interference beam corresponds to the relative velocity along the axis of the measurement beam of measurement cube corner 110 in respect of reference cube corner 100. The phase of the interference beam corresponds to the relative position of measurement cube corner 110 along the axis of the measurement beam.

Continuing to refer to FIG. 1, upon emerging from quarter wave plate 20, a portion of each of beams $f_1$ and $f_2$ is transmitted through beam splitter 30 in the direction of interferometer 40 (which is the optical portion of the interferometer system). The remaining portions of each of beams $f_1$ and $f_2$ are reflected towards non-polarizing beam splitter 50 and first 45-degree polarizer 90. Liquid crystal polarizer 60, power detector 70 and laser tuning servo 80 comprise feedback control means for monitoring and controlling the constancy of the output of laser source 10. For stability, the laser cavity of source 10 is temperature controlled using feedback from the power balance of the two laser modes produced by source 10. A portion of the beam delivered though non-polarizing beam splitters 30 and 50 is directed to liquid crystal polarizer 60, which alternately transmits light having first and second polarization states. Photodiode 70 measures the power balance over time and provides such information to laser tuning servo 80.

Note that as employed in the specification, drawings and claims hereof, and in the context of discussing, describing and/or claiming a DMI, a portion of a DMI or a DMI system, the term "monolithic" means an interferometer having at least polarizing or non-polarizing beam splitter sub-assembly comprising glass or an optically equivalent material and at least one cube corner, input, output, reflecting or retro-reflecting rhomb sub-assembly, also comprising glass or an optically equivalent material, where the beam splitter and the at least one cube corner, input, output, reflecting or retro-reflecting rhomb sub-assembly are physically located adjacent to one another, and are attached directly to one another by adhesive, mechanical (e.g., screws), chemical, electromagnetic and/or magnetic means such that the optical portion of the interferometer (which does not include the source, the detectors or the measurement cube or plane mirror of a DMI or DMI system), forms a single assembly.

FIG. 1 and the accompanying description set forth herein describe aspects of Agilent's Model Number 10705 Linear Interferometer in conformance with the definition of the term "monolithic" set forth herein, the 10705 Linear Interferometer has a monolithic design and structure.

Aspects of the DMI illustrated in FIG. 1 are disclosed in the following U.S. patents, the respective entireties of which are hereby incorporated by reference herein: U.S. Pat. No. 5,064, 280 to Bockman entitled "Linear-and-angular measuring plane mirror interferometer;" U.S. Pat. No. 6,542,247 to Bockman entitled "Multi-axis interferometer with integrated optical structure and method for manufacturing rhomboid assemblies;" and U.S. Pat. No. 5,667,768 to Bockman entitled "Method and interferometric apparatus for measuring changes in displacement of an object in a rotating reference frame."

To avoid confusion, note that the term "reference beam" as employed in the specification, drawings and claims hereof, and in the context of discussing, describing and/or claiming a DMI, a portion of a DMI or a DMI system, depending upon the particular context in which it is employed, may mean "local oscillator beam" or "reference beam." Note further that the term "measurement beam" as employed in the specification, drawings and claims hereof, and in the context of discussing, describing and/or claiming a DMI, a portion of a DMI or a DMI system, depending upon the particular context in which it is employed, may mean "probe beam" or "measurement beam."

In accordance with some embodiments of the present invention "local oscillator" and "probe" beams are emitted by the source, the local oscillator and reference beams being mixed within the interferometer to produce measurement and reference beams at the output. Although for the sake of simplicity I continue to refer to "reference beams" and "measurement beams" below, those terms are to be interpreted as set forth in the immediately foregoing paragraph, depending upon the particular context in which they appear.

Figure 2:
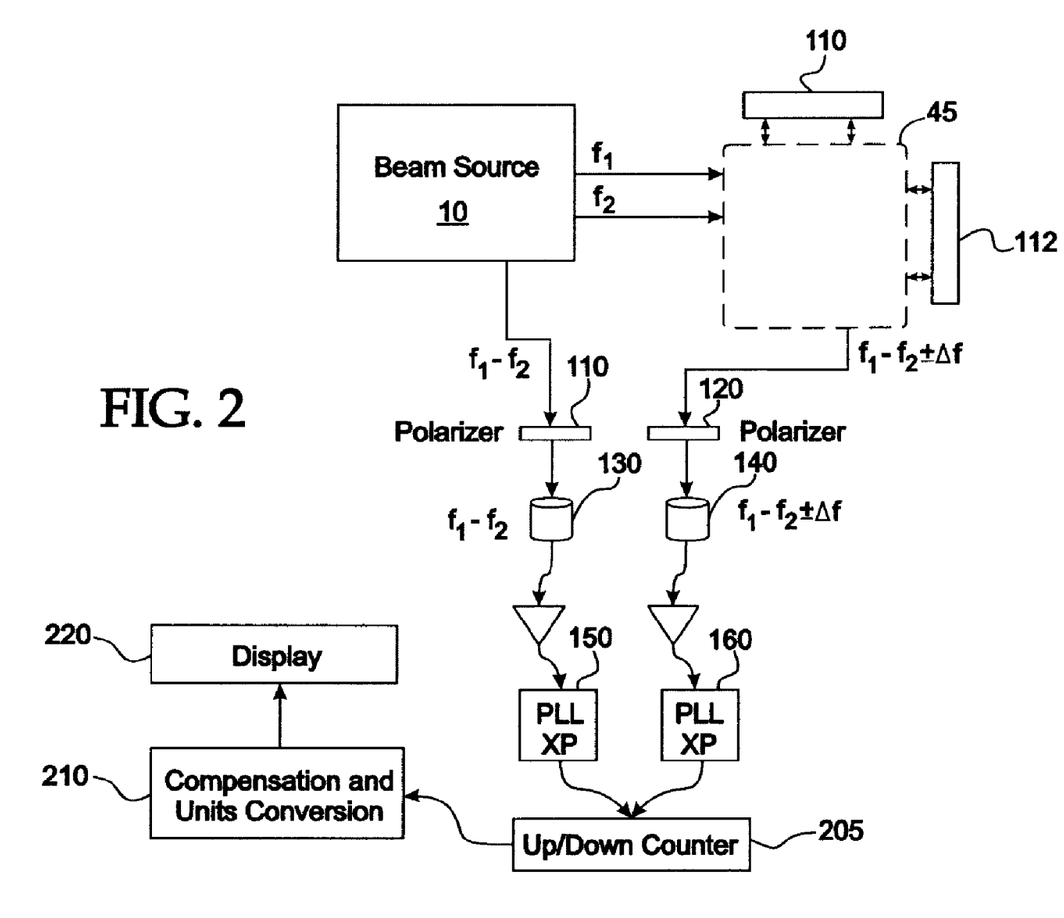
FIG. 2 shows a block diagram of one embodiment of a measuring interferometry system of the present invention.

Referring now to FIG. 2, there is shown a block diagram of one embodiment of a measuring interferometry system of the present invention where beam source 10 comprises a laser source capable of producing three output beams: a first beam having frequency $f_1$ and a first linear polarization state, a second beam having a frequency $f_2$ and a second linear polarization state orthogonal to the first polarization state, and a third beam comprising light having combined frequencies $f_1$ and $f_2$. The third beam is directed to polarizer 110 where frequencies $f_1$ and $f_2$ are combined to form a single polarization state and transmitted to detector 130. The first and second beams are directed to interferometer 45 of the present invention.

Continuing to refer to FIG. 2, optically separate first and second input beams $f_1$ and $f_2$ emitted by beam source 10 are delivered to interferometer 45. In a preferred embodiment of the present invention, interferometer 45 comprises one rhomb sub-assembly 190 containing a non-polarizing or polarizing beam-splitting interface 192 or 194. Plane mirrors 110 and 112 retro-reflect reference and measurement beams $f_1$ and $f_2$ incident thereon and originating from interferometer 45 (not shown in detail in FIG. 2). Plane mirror 110 is fixed or stationary respecting interferometer 45, while plane mirror 112 moves respecting interferometer 45.

The combined beams output by interferometer 45 are next directed through 45-degree polarizer 120 such that they emerge therefrom sharing a common polarization state. The output from phase detector 140 is input to phase locked loop detector 160, which in combination with up/down counter 200 yields a difference $\Delta f$, from which may be determined the distance or displacement that plane mirror 112 has moved respecting interferometer 45. FIGS. 3 through 6 show further details of various embodiments of interferometer 45.

In the embodiments of the present invention shown in FIGS. 3, 4, 5 and 6, quarter wave plates 170 and 180 are incorporated into interferometer 45. Quarter wave plates 170 and 180 feature non-mirrored surface. As a result, linearly-polarized beams incident upon and transmitted through plates 170 and 180 are transformed into circularly-polarized states. Rhomb sub-assembly 190 shown in FIGS. 3 through 6 may be constructed in accordance with the teachings of U.S. Pat. No. 6,542,247 to Bockman entitled "Multi-axis interferometer with integrated optical structure and method for manufacturing rhomboid assemblies."

Figure 3:
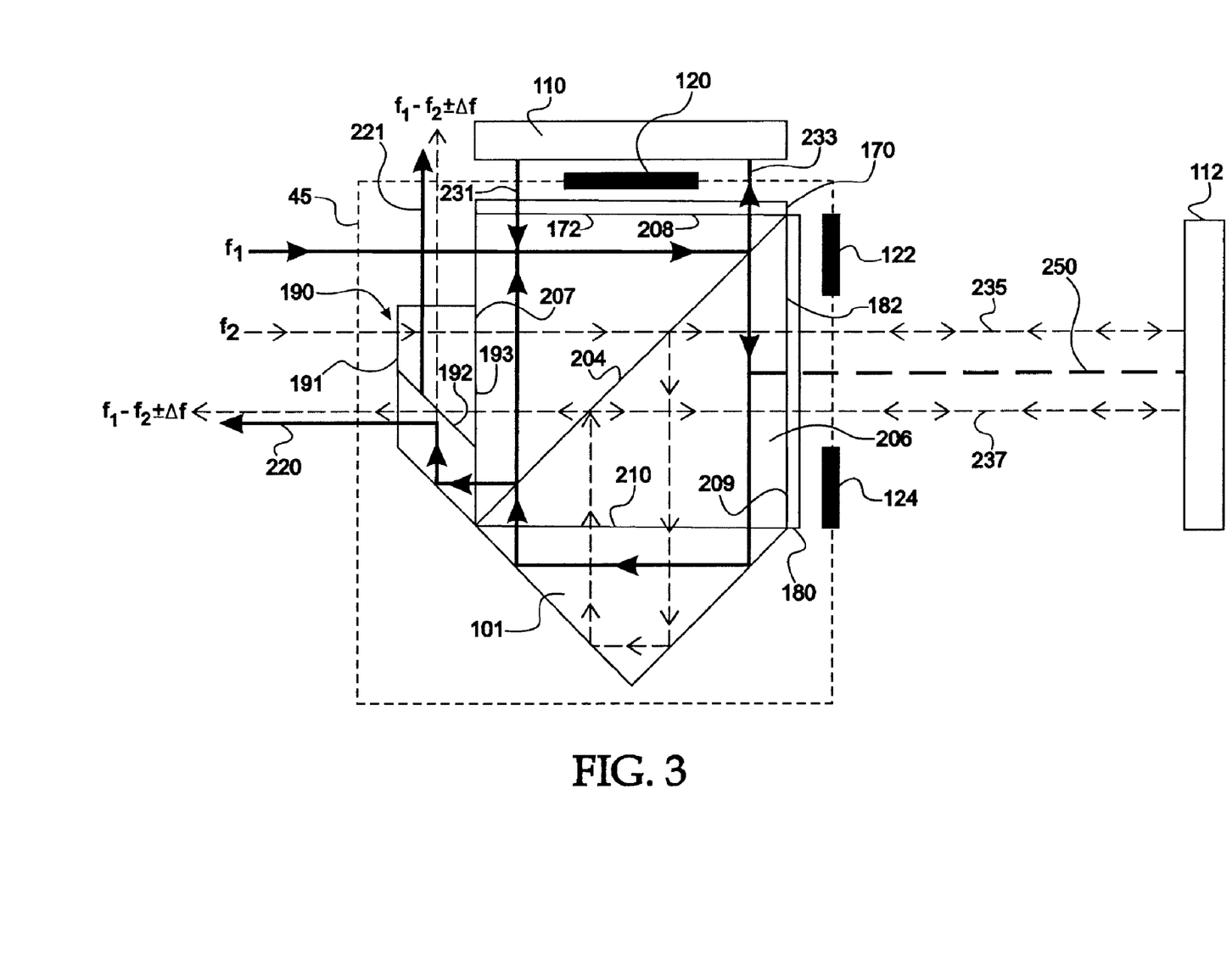
FIG. 3 shows one embodiment of a single-cube-corner interferometer of the present invention that provides redundant outputs and comprises a non-polarizing beam-splitting interface.

FIG. 3 shows one embodiment of a single-cube-corner interferometer of the present invention that provides redundant outputs and comprises non-polarizing beam-splitting interface 192. In FIG. 3, it will be seen that first beam $f_1$ and second beam $f_2$ enter interferometer 45 as separate beams. First beam f1 enters first face 207 of polarizing beam-splitter sub-assembly 206 and proceeds to polarizing beam splitter (PBS) interface 204 from which it is reflected upwardly to pass through quarter wave plate 170, reflect off stationary plane mirror 110 and proceed back downwardly through quarter wave plate 170. First beam f1 is in an S-polarized state upon entering interferometer 45 and thus is reflected off interface 204 when incident thereon. Upon passing the first time through quarter wave plate 170 first beam $f_1$ becomes circularly polarized in a first sense, and upon being reflected off mirror 110 it becomes circularly polarized in a second sense and passing through quarter wave plate 170 a second time becomes linearly p polarized and therefore passes through interface 204 while propagating downwardly towards cube corner 101.

Cube corner 101 causes first beam $f_1$ to be reflected upwardly, where it passes through interface 204 a second time, passes through quarter wave plate 170 a third time, becoming circularly polarized in one sense reflects off mirror 110 a second time, becoming circularly polarized in the opposite sense, passes through quarter wave plate 170 a fourth time and becomes s polarized so that it is now reflected off interface 204 towards rhomb 190. Having entered rhomb 190 through output face 193, first beam $f_1$ is reflected upwardly off a corner of rhomb sub-assembly 190 for incidence upon and reflection from non-polarizing beam splitter 192, where first beam $f_1$ is combined with second beam $f_2$, the combined output beam containing the information delta f, which is used to calculate the displacement or position of moving plane mirror 112. Note further that rhomb 190 provides two sets of identical combined beam outputs 220 and 221 for redundancy in case one of such outputs becomes rendered unusable. Each such combined beam output 220 or 221 contains the information $(f_1-f_2) \pm \Delta f$, which is employed in subsequent steps to calculate the displacement or position of moving mirror 112.

Continuing to refer to FIG. 3, second beam $f_2$ enters interferometer 45 through input face 191 of rhomb sub-assembly, passes through interface 204 owing to its p-polarization state, is transmitted through quarter wave plate 180 and changed to a first circular polarization state, and reflected off moving plane mirror 112, which changes the sense of the circular polarization. Reflected beam $f_2$ re-enters quarter wave plate 180 where it is changed to linearly s polarized state, and then reflected downwardly from interface 204. Downwardly-reflected beam $f_2$ is next reflected sideways and upwardly by corner cube 101 for incidence upon and reflection from interface 204 towards mirror 112, from which it is reflected back into interferometer 45 to emerge from rhomb 190 as a portion of combined beams 220 and 221.

In FIG. 3, beam blockers 120, 122 and 124 are strategically positioned between quarter wave plates 170 and 190 and mirrors 110 and 112 to capture, absorb, scatter, diffuse or appropriately or harmlessly reflect extraneous or undesired light beams incident thereon that might otherwise contaminate or interfere with beams $f_1$ and $f_2$ incident upon and reflected from mirrors 110 and 112. Many extraneous or undesired light beams traveling outside the desired raypaths of beams $f_1$ and $f_2$ illustrated in FIG. 3 are captured, diffused, reflected harmlessly or absorbed by beam blockers 120, 122 and 124.

Beam blocker 110 corresponding to quarter wave plate 170 and stationary mirror 110 is disposed centrally or between desired raypaths 231 and 233 of beam $f_2$, while beam blockers 112 and 124 are disposed non-centrally or to either side of desired raypaths 235 and 237. Note that raypaths 235 and 237, and beam blockers 122 and 124 are disposed to either side of imaginary central axis 250 in FIGS. 3 and 4.

Beam blockers 120, 122 and 124 are be formed of suitable materials capable of appropriately absorbing, diffusing, scattering, reflecting, refracting or otherwise appropriately re-directing extraneous or undesired light beams, with a view towards preventing such extraneous or undesired light from contaminating or interfering with light beams $f_1$ and $f_2$. Accordingly, beam blockers 120, 122 and 124 may have optically opaque or roughened surfaces disposed thereon, or may be formed of an optically reflective or refractive material that directs intercepted extraneous light away from raypaths 231, 233, 235 and 237. Other materials known to those skilled in the art may of course be employed to the same ends.

Note that the embodiment of the present invention illustrated in FIG. 3 has balanced or equivalent glass paths for each of beams $f_1$ and $f_2$. That is, the amount of glass or other optically transparent or substantially transparent material traversed by beams $f_1$ and $f_2$ is substantially identical. Such balanced glass paths significantly reduce errors introduced by thermal expansion and contraction of the various components of interferometer 45, as the same amount of expansion or contraction occurs along each of the paths traversed by beams $f_1$ and $f_2$. Note further that no mixing of polarized light beams $f_1$ and $f_2$ occurs until just before beams $f_1$ and $f_2$ are combined and output by rhomb 190 as combined beams 220 and 221. Such reduced mixing of polarized light beams significantly reduces light-mixing-induced errors.

Continuing to refer to FIG. 3, interferometer 45 comprises rhomb sub-assembly 190 having first input surface 191 and first output surface 193, with non-polarizing beam-splitting interface 192 being disposed therewithin. Polarizing beam splitter sub-assembly 206 comprises at least first, second and third and fourth faces 207, 208, 209 and 210, respectively, and includes polarizing beam splitter interface 204 located therewithin. Polarizing beam splitter interface 204 preferably comprises an immersed polarizing beam splitting coating, or a dielectric coating sandwiched between two layers of optical glass, the coating being capable of selectively polarizing light beams incident thereupon. First quarter wave plate 170 has first input face 172, while second quarter wave plate 180 has second input face 182.

First output surface 193 of rhomb sub-assembly 190 is preferably attached to first face 207 of beam splitter sub-assembly 206 by means of optically-transparent or substantially optically transparent adhesive or glue. First and second input faces 172 and 182 of first and second quarter wave plates 170 and 180 are attached to third face 209 of beam splitter sub-assembly 206, again preferably by means of optically-transparent or substantially optically transparent adhesive or glue. Alternatively the quarter wave plates 170 and 180 may be optically contacted to the PBS assembly surfaces 208 and 209.

As shown in FIGS. 3 through 6, rhomb sub-assembly 190, quarter wave plates 170 and 180, and beam splitter sub-assembly 206 are configured and attached to one another to permit first beam $f_1$ and second beam $f_2$ to enter interferometer assembly 45 without initially passing through non-polarizing or polarizing beam-splitting interface 192192 or 194 such that first beam $f_1$ and second beam $f_2$ enter beam splitter sub-assembly 206 without initially being split and reflected off portions of interface 192 or 194.

Rhomb sub-assembly 190, cube corners 101 and 103, polarizing beam splitter sub-assembly 206, and quarter wave plates 180 and 190 each preferably comprise stacks of appropriately machined (or otherwise formed) and coated glass plates or components as described in U.S. Pat. No. 6,542,247 to Bockman. In preferred embodiments of the present invention, rhomb sub-assembly 190 is formed by adhering or gluing two pieces of glass together, with the adhesive or glue interface forming the amplitude- or beam-splitting interfaces thereof. Faces 193 and 207, 172 and 208, 182 and 209, and 103 and 210 and 105 and 210 of such sub-assemblies are preferably glued to one another, also as described in U.S. Pat. No. 6,542,247 to Bockman. Accordingly, and consistent with the definition of the term "monolithic" set forth hereinabove, interferometer 45 shown in FIGS. 3 through 6 is monolithic.

Note, however, that stationary mirror 110 may be attached by various suitable means to interferometer 45, as may beam blockers 120, 122 and 124. In a preferred embodiment of the present invention, moving mirror 112 is not attached to interferometer 45.

Note further that beam blockers 120, 122 and 124 may assume any number of suitable shapes, such as circles, ellipses, squares, rectangles or triangles and may further comprise shapes having one or more holes disposed therethrough for permitting the passage of desired raypaths 231, 233, 235 and 237 therethrough. Additionally, more than one surface of any of beam blockers 120, 122 and 124 may be textured or configured to intercept light from incident upon any surface of such beam blockers. Thus, and by way of example only, the left, right, top and bottom surfaces of beam blocker 122 shown in FIG. 3 may be textured or configured to intercept light incident thereon and arriving from the direction of polarizing beam splitter sub-assembly 206, from the direction of plane mirror 112, the direction of plane mirror 110, the direction of raypath 233 or the direction of raypath 235 or 237.

Figure 4:
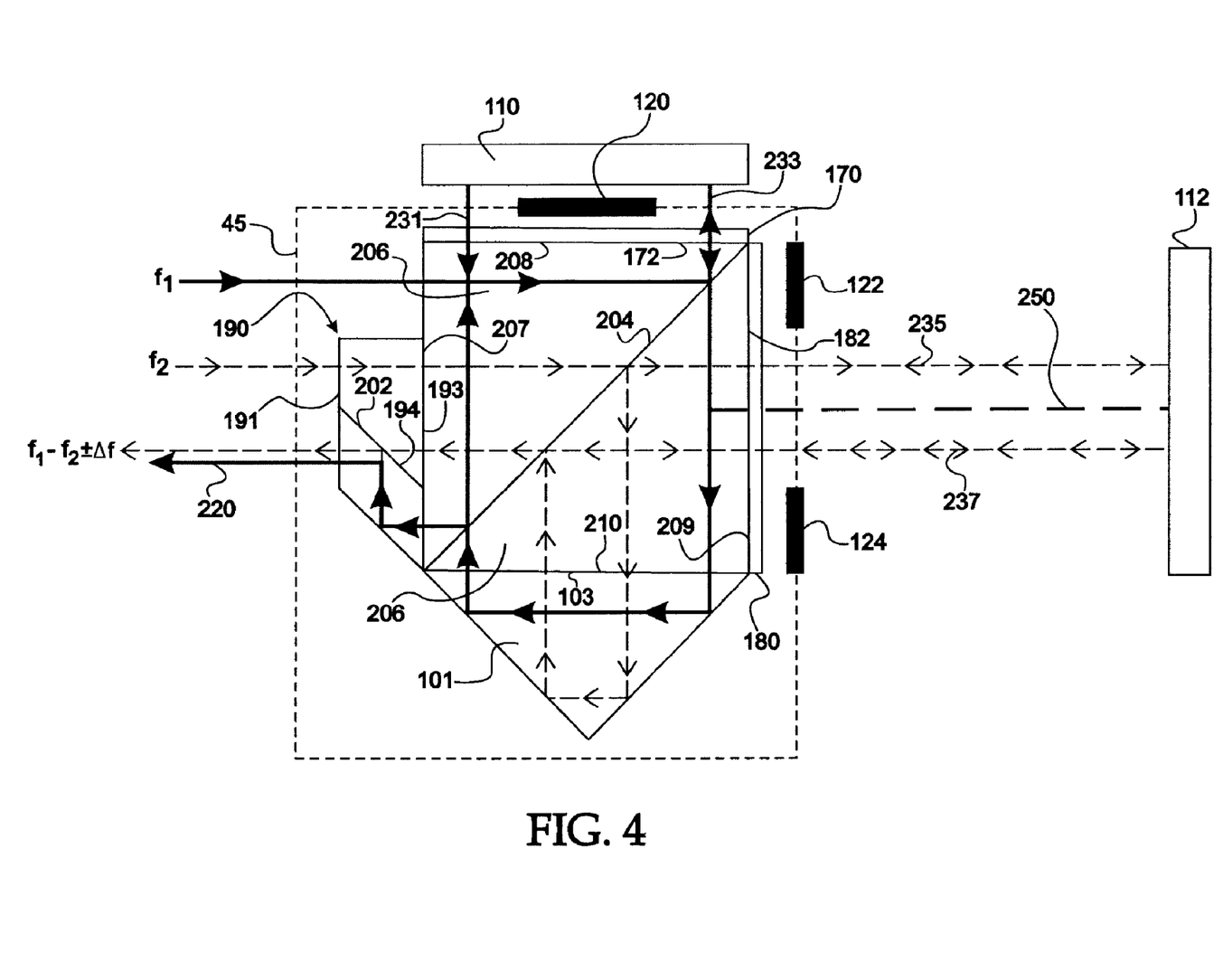
FIG. 4 shows one embodiment of a single-cube-corner interferometer of the present invention that provides a single output and comprises a polarizing beam-splitting interface.

FIG. 4 shows one embodiment of a single-cube-corner interferometer of the present invention that provides a single output and comprises polarizing beam-splitting interface 194. The embodiment of the present invention shown in FIG. 4 includes amplitude-splitting polarizing rhomb sub-assembly 190 containing interface 194, which reflects beam $f_1$ and transmits beam $f_2$ incident thereon, and which provides a combined output beam 220 comprising beams $f_1$ and $f_2$. As in the embodiment of the present invention illustrated in FIG. 3, polarizing beam splitter interface 204 of polarizing beam splitter sub-assembly 206 blocks and reflects, or passes, P- or S-polarized beams incident thereon. As in FIG. 3, quarter wave plates 170 and 180 induce changes in polarization state in beams transmitted therethrough. Note that the embodiment of the present invention illustrated in FIG. 4 provides only a single combined beam output 220.

Rhomb sub-assembly 190, polarizing beam splitter sub-assembly 206, cube corner 101 and quarter wave plates 170 and 180 each preferably comprise one or more stacks of appropriately machined (or otherwise formed) and coated glass plates as described in U.S. Pat. No. 6,542,247 to Bockman. Faces 193 and 207, 172 and 208, 182 and 209, and 103 and 210 and 105 and 210 of such sub-assemblies are preferably glued to one another, also as described in U.S. Pat. No. 6,542,247 to Bockman. Alternatively, faces 172, 208, 182 and 209 may be optically contacted. Accordingly, and consistent with the definition of the term "monolithic" set forth hereinabove, interferometer 45 shown in FIG. 4 is monolithic.

As in the embodiment of the present invention shown in FIG. 3, beam blockers 120, 122 and 124 are strategically positioned between quarter wave plates 170 and 190 and mirrors 110 and 112 to capture, scatter, diffuse or appropriately or harmlessly reflect extraneous or undesired light beams incident thereon that might otherwise contaminate or interfere with beams $f_1$ and $f_2$ incident upon and reflected from mirrors 110 and 112. Many extraneous or undesired light beams traveling outside the desired raypaths of beams $f_1$ and $f_2$ illustrated in FIG. 3 are captured, diffused, reflected harmlessly or absorbed by beam blockers 120, 122 and 124. As in FIG. 3, beam blocker 120 corresponding to quarter wave plate 170 and stationary mirror 110 is disposed centrally or between desired raypaths 231 and 233 of beam $f_2$, while beam blockers 112 and 124 are disposed non-centrally or to either side of desired raypaths 235 and 237. Beam blockers 120, 122 and 124 may be formed of the suitable materials, and may be configured as, described above.

Note that the embodiment of the present invention illustrated in FIG. 4 has balanced or equivalent glass paths. That is, the amount of glass or other optically transparent or substantially transparent material traversed by beams $f_1$ and $f_2$ is substantially identical. Such balanced or equivalent glass paths significantly reduce errors introduced by thermal expansion and contraction of the various components of interferometer 45, as the same amount of expansion or contraction occurs along each of the paths traversed by beams $f_1$ and $f_2$. Note further that as in FIG. 3 no mixing of polarized light beams $f_1$ and $f_2$ occurs until just before beams $f_1$ and $f_2$ are combined and output by rhomb 190 as combined beam 220. Such reduced mixing of polarized light beams significantly reduces light-mixing-induced errors.

Figure 5:
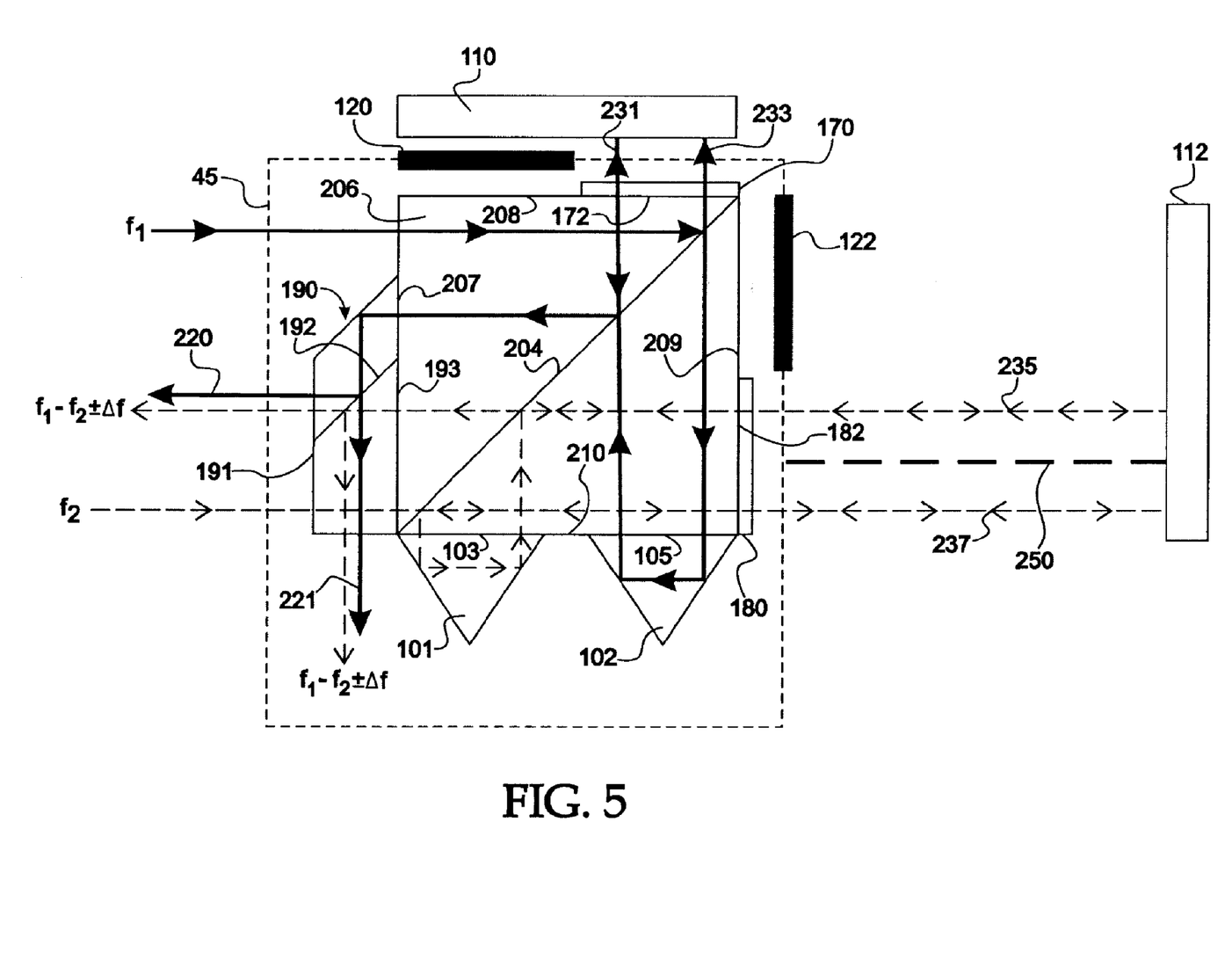
FIG. 5 shows one embodiment of a dual-cube-corner interferometer of the present invention that provides redundant outputs and comprises a non-polarizing beam-splitting interface.

FIG. 5 shows one embodiment of a dual-cube-corner interferometer of the present invention that provides redundant outputs and comprises non-polarizing beam-splitting interface 192. The embodiment of the present invention shown in FIG. 5 includes rhomb sub-assembly 190 containing non-polarizing interface 192, which both transmits and reflects beams $f_1$ and $f_2$ incident thereon, depending on their state of polarization, and provides two redundant combined output beams 220 and 221, each comprising beams $f_1$ and $f_2$.

As in the embodiments of the present invention illustrated in FIGS. 3 and 4, polarizing beam splitter interface 204 of polarizing beam splitter sub-assembly 206 blocks and reflects, or passes, P- or S-polarized beams incident thereon. Quarter wave plates 170 and 180 induce changes in polarization state in beams transmitted therethrough. Note that the embodiment of the present invention illustrated in FIG. 5 comprises two separate cube corners 101 and 102, which are attached via faces 103 and 105 to face 210 of beam-splitter sub-assembly 206. Cube corner 102 reflects and redirects beam $f_1$, while cube corner 101 reflects and redirects beam $f_2$.

Rhomb sub-assembly 190, polarizing beam splitter sub-assembly 206, cube corner 101 and quarter wave plates 170 and 180 are preferably constructed and formed in accordance with the teachings set forth above. Accordingly, and consistent with the definition of the term "monolithic" set forth hereinabove, interferometer 45 shown in FIG. 5 is monolithic.

In FIG. 5, beam blockers 120 and 122 are strategically positioned laterally respecting raypaths 231, 233, 235 and 237 to capture, scatter, diffuse or appropriately or harmlessly reflect extraneous or undesired light beams incident thereon that might otherwise contaminate or interfere with beams $f_1$ and $f_2$. Many extraneous or undesired light beams traveling outside the desired raypaths of beams $f_1$ and $f_2$ illustrated in FIG. 5 are captured, diffused, reflected harmlessly or absorbed by beam blockers 120 and 122.

Unlike in FIGS. 3 and 4, however, note that raypaths 231 and 233 are positioned next to one another, and in consequence beam blocker 120 is laterally displaced in respect of quarter wave plate 170. Also unlike in FIGS. 3 and 4, only a single beam blocker 122 is employed to intercept extraneous light that might otherwise contaminate or interfere with raypaths 235 and 237. Note that raypaths 235 and 237, and beam blocker 122 are disposed to either side of imaginary central axis 250 in FIGS. 5 and 6.

Beam blockers 120 and 122 may be formed of the suitable materials, and may be configured as, described above.

Note that the embodiment of the present invention illustrated in FIG. 5 has balanced or equivalent glass paths. That is, the amount of glass or other optically transparent or substantially transparent material traversed by beams $f_1$ and $f_2$ is substantially identical. Such balanced glass paths significantly reduce errors introduced by thermal expansion and contraction of the various components of interferometer 45, as the same amount of expansion or contraction occurs along each of the paths traversed by beams $f_1$ and $f_2$. Note further that as in FIGS. 3 and 4 no mixing of polarized light beams $f_1$ and $f_2$ occurs until just before beams $f_1$ and $f_2$ are combined and output by rhomb 190 as combined beam 220. Such reduced mixing of polarized light beams significantly reduces light-mixing-induced errors.

Figure 6:
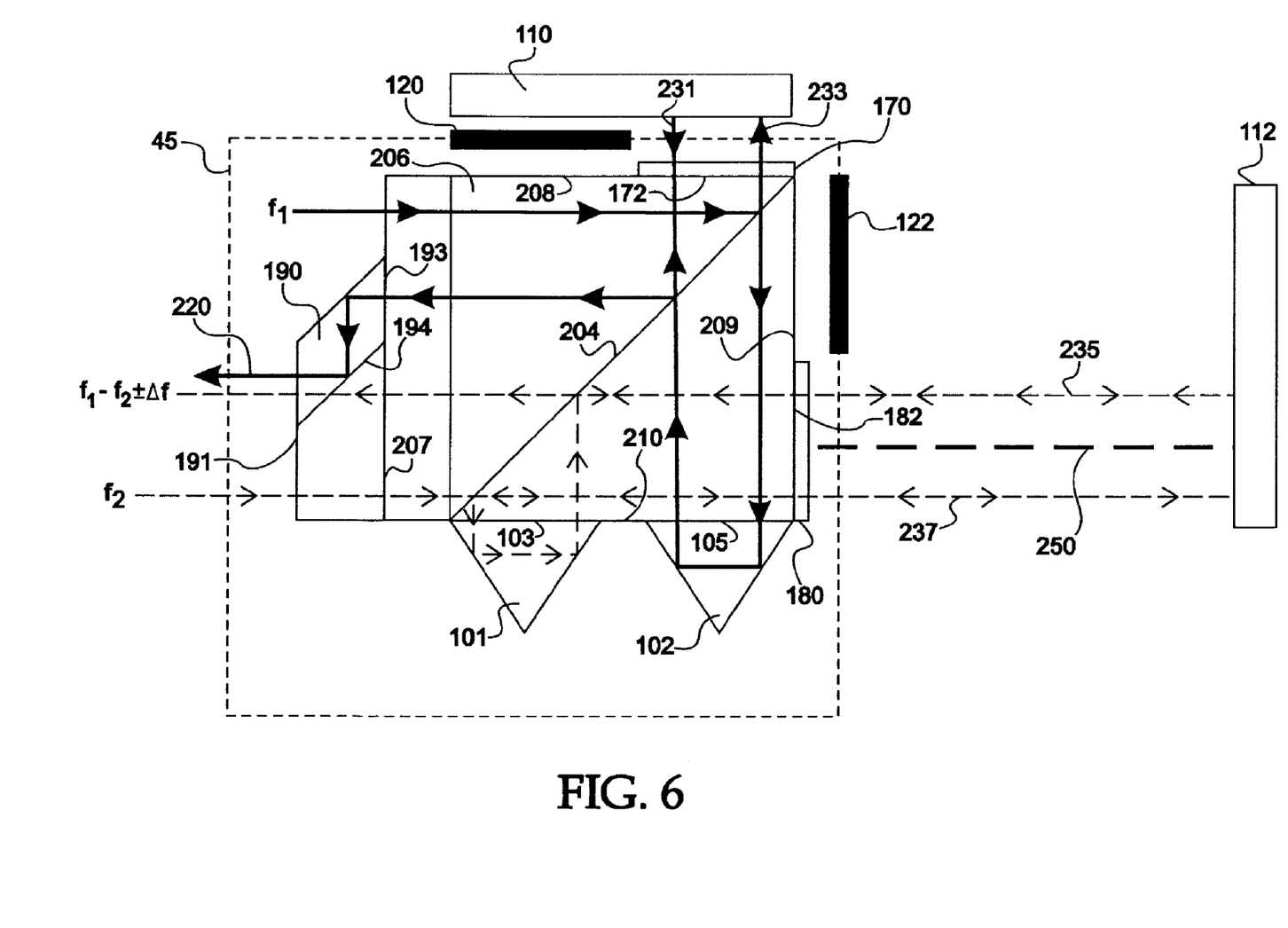
FIG. 6 shows one embodiment of a dual-cube-corner interferometer of the present invention that provides a single output and comprises a polarizing beam-splitting interface.

FIG. 6 shows one embodiment of a dual-cube-corner interferometer of the present invention that provides a single output and comprises polarizing beam-splitting interface 194. The embodiment of the present invention shown in FIG. 6 includes amplitude-splitting polarizing rhomb sub-assembly 190 containing polarizing interface 194 which both transmits and reflects beams $f_1$ and $f_2$ incident thereon, depending on their state of polarization, but provides only a single combined output beam 220 comprising beams $f_1$ and $f_2$.

As in FIG. 5, two separate cube corners 101 and 102 are provided, which are attached via faces 103 and 105 to face 210 of beam-splitter sub-assembly 206. Cube corner 102 reflects and redirects beam $f_1$, while cube corner 101 reflects and redirects beam $f_2$. Rhomb sub-assembly 190, polarizing beam splitter sub-assembly 206, cube corner 101 and quarter wave plates 170 and 180 are preferably constructed and formed in accordance with the teachings set forth above. Accordingly, and consistent with the definition of the term "monolithic" set forth hereinabove, interferometer 45 shown in FIG. 6 is monolithic.

Also as in FIG. 5, beam blockers 120 and 122 are strategically positioned laterally respecting raypaths 231, 233, 235 and 237 to capture, scatter, diffuse or appropriately or harmlessly reflect extraneous or undesired light beams incident thereon that might otherwise contaminate or interfere with beams $f_1$ and $f_2$. Many extraneous or undesired light beams traveling outside the desired raypaths of beams $f_1$ and $f_2$ illustrated in FIG. 6 are captured, diffused, reflected harmlessly or absorbed by beam blockers 120 and 122.

As in FIG. 5, raypaths 231 and 233 are positioned next to one another. Consequently, beam blocker 120 is laterally displaced in respect of quarter wave plate 170. Also as in FIG. 5, only a single beam blocker 122 is employed to intercept extraneous light that might otherwise contaminate or interfere with raypaths 235 and 237. Beam blockers 120 and 122 may be formed of the suitable materials, and may be configured as, described above.

Note that the embodiment of the present invention illustrated in FIG. 6 has balanced glass paths. That is, the amount of glass or other optically transparent or substantially transparent material traversed by beams $f_1$ and $f_2$ is substantially identical. Such balanced glass paths significantly reduce errors introduced by thermal expansion and contraction of the various components of interferometer 45, as the same amount of expansion or contraction occurs along each of the paths traversed by beams $f_1$ and $f_2$. Note further that as in FIGS. 3, 4 and 5 no mixing of polarized light beams $f_1$ and $f_2$ occurs until just before beams $f_1$ and $f_2$ are combined and output by rhomb 190 as combined beam 220. Such reduced mixing of polarized light beams significantly reduces light-mixing-induced errors.

Note that since some embodiments of the present invention comprise interferometers that are monolithic and that comprise optical elements attached directly to one another, no frames or the like may be required for holding or positioning the various optical elements thereof.

While Schott BK-7 glass has been determined to be a particularly well-suited glass for monolithic interferometers of the type described herein, optically-suitable materials other than glass may be employed to construct the input rhomb and polarizing beam splitter sub-assemblies of the present invention. As described above, the present invention may be employed in single- or dual-pass interferometers, as well as in interferometers having three or more optical axes. Laser sources other than helium-neon sources may also be employed in various embodiments of the present invention. As a result, the present invention includes within its scope multi-axis interferometers, wherein input beams $f_1$ and $f_2$ are split into the required number of axes using input rhombs in accordance with the teaching set forth in U.S. Pat. No. 6,542,247 to Bockman. Moreover, the various structures, architectures, systems, assemblies, sub-assemblies, components and concepts disclosed herein may be employed in non-monolithic interferometers.

Accordingly, some claims presented herein are not intended to be limited to monolithic embodiments of the present invention, while other claims are not intended to be limited to the various embodiments of the present invention that are explicitly shown in the drawings or explicitly discussed in the specification hereof. All patents and publications described hereinabove are hereby incorporated by reference herein, each in its respective entirety.

I claim:

1. A displacement measuring plane minor interferometer adapted to receive as spatially separate inputs therein first and second beams, $f_1$ and $f_2$ respectively, the first beam differing in wavelength from the second beam, the interferometer comprising:

a polarizing beam splitter sub-assembly constructed from a first optically transparent solid material, receiving beams $f_1$ and $f_2$ as spatially separate inputs therein, wherein beams $f_1$ and $f_2$ are not combined while traversing the polarizing beam splitter sub-assembly, a beam combiner sub-assembly comprising a second optically transparent solid material, the beam combiner sub-assembly receiving beams $f_1$ and $f_2$ as spatially separate inputs therein from the polarizing beam splitter sub-assembly, and combining beams $f_1$ and $f_2$, and first and second plane minors, $f_1$ being reflected from the first minor and $f_2$ being reflected from the second minor;

wherein the polarization states of $f_1$ and $f_2$ are mutually orthogonal upon entry into the polarizing beam splitter sub-assembly and wherein $f_1$ and $f_2$ traverse first and second optical paths, with substantially equal first and second optical path lengths, wherein the first optical path length is the sum of the optical path length traversed by $f_1$ through the first material of the polarizing beam splitter sub-assembly and the optical path length traversed by $f_1$ through the second material of the beam combiner sub-assembly, and wherein the second optical path length is the sum of the optical path length traversed by $f_2$ through the first material of the polarizing beam splitter sub-assembly and the optical path length traversed by $f_2$ through the second material of the beam combiner sub-assembly.

2. The interferometer of claim 1, further comprising at least one cube corner through which $f_1$ and $f_2$ pass in traversing the first and second paths, respectively.

3. The interferometer of claim 1, further comprising at least one beam blocker positioned between the polarizing beam splitter assembly and one of the first and second mirrors.

4. The interferometer of claim 1, further comprising at least two beam blockers, each beam blocker being positioned between the polarizing beam splitter and one of the first and second mirrors.

5. The interferometer of claim 1, further comprising at least three beam blockers, each beam blocker being positioned between the polarizing beam splitter and one of the first and second mirrors.

6. The interferometer of claim 1, further comprising at least one quarter wave plate, one of $f_1$ and $f_2$ passing through the at least one quarter wave plate.

7. The interferometer of claim 1, further comprising at least two quarter wave plate, one of the quarter wave plates operating on $f_1$ and the other of the quarter wave plates operating $f_2$.

8. A displacement measuring plane minor interferometer adapted to receive as spatially separate inputs therein first and second beams, $f_1$ and $f_2$ respectively, the first beam differing in wavelength from the second beam, the interferometer comprising:

a polarizing beam splitter sub-assembly constructed from a first optically transparent solid material, receiving beams $f_1$ and $f_2$ as spatially separate inputs therein, wherein beams $f_1$ and $f_2$ are not combined while traversing the polarizing beam splitter sub-assembly, a beam combiner sub-assembly comprising a second optically transparent solid material, the beam combiner sub-assembly receiving beams $f_1$ and $f_2$ as spatially separate inputs therein from the polarizing beam splitter sub-assembly, and combining beams $f_1$ and $f_2$ and first and second plane mirrors, $f_1$ being reflected from the first minor and $f_2$ being reflected from the second mirror;

wherein the polarization states of $f_1$ and $f_2$ are mutually orthogonal upon entry into the polarizing beam splitter sub-assembly and wherein $f_1$ and $f_2$ traverse first and second optical paths, with substantially equal first and second optical path lengths, wherein the first optical path length is the sum of the optical path length traversed by $f_1$ through the first material of the polarizing beam splitter sub-assembly and the optical path length traversed by $f_1$ through the second material of the beam combiner sub-assembly, and wherein the second optical path length is the sum of the optical path length traversed by $f_2$ through the first material of the polarizing beam splitter sub-assembly and the optical path length traversed by $f_2$ through the second material of the beam combiner sub-assembly; and wherein the beam combiner sub-assembly comprises a rhomb sub-assembly.

9. The interferometer of claim 8, wherein the rhomb sub-assembly further comprises a polarizing beam splitting polarizing interface.

10. A displacement measuring plane mirror interferometer adapted to receive as separate inputs therein first and second beams, $f_1$ and $f_2$, respectively, the first beam differing in wavelength from the second beam, the interferometer comprising:
  at least one polarizing beam splitter sub-assembly constructed from an optically transparent material,
  a beam combiner sub-assembly that receives and combines beams $f_1$ and $f_2$ after leaving the polarizing beam splitter sub-assembly, $f_1$ and $f_2$ not otherwise being combined while traversing the polarizing beam splitter sub-assembly,
  first and second plane mirrors, $f_1$ being reflected from the first mirror and $f_2$ being reflected from the second mirror;
  wherein the polarization states of $f_1$ and $f_2$ are mutually orthogonal upon entry into the beam splitter sub-assembly and wherein $f_1$ and $f_2$ traverse first and second optical paths, the first optical path traversing substantially the same length of the optically transparent material as the second optical path; and
  wherein the beam combiner sub-assembly comprises a rhomb sub-assembly; and
  wherein the rhomb sub-assembly further comprises a non-polarizing beam-splitting interface.

11. A displacement measuring plane mirror interferometer adapted to receive as separate inputs therein first and second beams $f_1$ and $f_2$, the interferometer comprising:
  a polarizing beam splitter sub-assembly, and
  a rhomb sub-assembly attached to a face of the polarizing beam splitter sub-assembly, the rhomb sub-assembly being configured to receive and combine $f_1$ and $f_2$ provided as outputs thereto by the polarizing beam splitter sub-assembly, $f_1$ and $f_2$ not otherwise being combined while traversing the polarizing beam splitter sub-assembly;
  wherein the polarization states of the $f_1$ and $f_2$ as they enter the polarizing beam splitter sub-assembly are mutually orthogonal; and
  wherein the rhomb sub-assembly is directly attached to the polarizing beam splitter sub-assembly either by means of optically-transparent or substantially optically transparent adhesive or glue, or simply by contact.

12. The interferometer of claim 11, wherein the rhomb sub-assembly further comprises a polarizing beam-splitting interface.

13. The interferometer of claim 11, further comprising at least one cube corner through which the first and second beams pass while traversing first and second substantially equivalent and separate optical pathways, respectively.

14. The interferometer of claim 11, further comprising at least one quarter wave plate between the polarizing beam splitter and one of the planar mirrors.

15. The interferometer of claim 11, further comprising at least two quarter wave plates, each quarter waveplate being positioned between the polarizing beam splitter and a corresponding one of the planar mirrors.

16. A displacement measuring plane mirror interferometer adapted to receive as separate inputs therein first and second beams $f_1$ and $f_2$, the interferometer comprising a polarizing beam splitter sub-assembly and a rhomb sub-assembly attached to-a face of the polarizing beam splitter sub-assembly, the rhomb sub-assembly being configured to receive and combine beams $f_1$ and $f_2$ provided as outputs thereto by the polarizing beam splitter sub-assembly, beams $f_1$ and $f_2$ not otherwise being combined while traversing the polarizing beam splitter sub-assembly;
  wherein the rhomb sub-assembly further comprises a non-polarizing beam-splitting interface; and
  wherein the rhomb sub-assembly is directly attached to the polarizing beam splitter sub-assembly either by means of optically-transparent or substantially optically transparent adhesive or glue, or simply by contact.

17. A displacement measuring plane mirror interferometer adapted to receive as separate inputs therein first and second beams, $f_1$ and $f_2$, the interferometer comprising:
  a polarizing beam splitter sub-assembly;
  a rhomb sub-assembly attached to a face of the polarizing beam splitter sub-assembly, the rhomb sub-assembly being configured to receive and combine $f_1$ and $f_2$ provided as outputs thereto by the polarizing beam splitter sub-assembly, $f_1$ and $f_2$ not otherwise being combined while traversing the polarizing beam splitter sub-assembly; and
  at least one beam blocker positioned between the polarizing beam splitter sub-assembly and a planar mirror from which one of $f_1$ and $f_2$ is reflected;
  wherein the rhomb sub-assembly is directly attached to the polarizing beam splitter sub-assembly either by means of optically-transparent or substantially optically transparent adhesive or glue, or simply by contact.

18. A displacement measuring plane mirror interferometer adapted to receive as separate inputs therein first and second beams $f_1$ and $f_2$, the interferometer comprising:
  a polarizing beam splitter sub-assembly;
  a rhomb sub-assembly attached to a face of the polarizing beam splitter sub-assembly, the rhomb sub-assembly being configured to receive and combine $f_1$ and $f_2$ provided as outputs thereto by the polarizing beam splitter sub-assembly, $f_1$ and $f_2$ not otherwise being combined while traversing the polarizing beam splitter sub-assembly; and
  at least two beam blockers, each beam blocker being positioned between the polarizing beam splitter sub-assembly and a corresponding planar mirror from which one of $f_1$ and $f_2$ is reflected;
  wherein the rhomb sub-assembly is directly attached to the polarizing beam splitter sub-assembly either by means of optically-transparent or substantially optically transparent adhesive or glue, or simply by contact.

19. A displacement measuring plane mirror interferometer adapted to receive as separate inputs therein first and second beams $f_1$ and $f_2$, the interferometer comprising:
  a polarizing beam splitter sub-assembly;
  a rhomb sub-assembly attached to a face of the polarizing beam splitter sub-assembly, the rhomb sub-assembly being configured to receive and combine $f_1$ and $f_2$ provided as outputs thereto by the polarizing beam splitter sub-assembly, $f_1$ and $f_2$ not otherwise being combined while traversing the polarizing beam splitter sub-assembly; and
  at least three beam blockers, each beam blocker being positioned between the polarizing beam splitter sub-assembly and a corresponding one of the planar mirrors from which one of $f_1$ and $f_2$ is reflected;
  wherein the rhomb sub-assembly is directly attached to the polarizing beam splitter sub-assembly either by means of optically-transparent or substantially optically transparent adhesive or glue, or simply by contact.

20. A monolithic displacement measuring plane mirror interferometer system adapted to receive as separate inputs therein first and second beams $f_1$ and $f_2$, the interferometer system comprising a polarizing beam splitter (PBS) sub-assembly, a first quarter wave plate attached to a first face of the PBS sub-assembly, a second quarter wave plate attached to a second face of the PBS sub-assembly, a stationary mirror positioned operably respecting the first quarter wave plate, a moving mirror positioned operably respecting the second quarter wave plate, and a first beam blocker positioned between the stationary mirror and the first quarter wave plate;

further comprising a rhomb sub-assembly attached to a face of the polarizing beam splitter sub-assembly, the rhomb sub-assembly being configured to receive and combine beams $f_1$ and $f_2$ provided as outputs thereto by the polarizing beam splitter sub-assembly, beams $f_1$ and $f_2$ not otherwise being combined while traversing the polarizing beam splitter sub-assembly;

wherein the rhomb sub-assembly is directly attached to the polarizing beam splitter sub- assembly either by means of optically-transparent or substantially optically transparent adhesive or glue, or simply by contact; and wherein the rhomb sub-assembly further comprises a non-polarizing beam-splitting interface.

* * * * *

UNITED STATES PATENT AND TRADEMARK OFFICE
CERTIFICATE OF CORRECTION

PATENT NO. : 7,705,994 B2  Page 1 of 1
APPLICATION NO. : 11/286817
DATED : April 27, 2010
INVENTOR(S) : Alan B. Ray It is certified that error appears in the above-identified patent and that said Letters Patent is hereby corrected as shown below:

In column 11, line 42, in claim 1, delete "minor" and insert -- mirror --, therefor.

In column 11, line 44, in claim 1, delete "f2" and insert -- $f_2$, --, therefor.

In column 11, line 57, in claim 1, delete "minors," and insert -- mirrors, --, therefor.

in column 11, line 58, in claim 1, delete "minor" and insert -- mirror --, therefor.

In column 11, line 58, in claim 1, delete "minor" and insert -- mirror --, therefor.

In column 12, line 28, in claim 8, delete "minor" and insert -- mirror --, therefor.

In column 12, line 43, in claim 8, delete "f2" and insert -- $f_2$, --, therefor.

In column 12, line 45, in claim 8, delete "minor" and insert -- mirror --, therefor.

In column 13, line 12, in claim 10, delete "minor" and insert -- mirror --, therefor.

In column 16, line 4, in claim 20, delete "sub- assembly" and insert -- sub-assembly --, therefor.

Signed and Sealed this

Sixth Day of July, 2010

David J. Kappos
*Director of the United States Patent and Trademark Office*